United States Patent
Ebrahimi Afrouzi et al.

(10) Patent No.: US 10,185,815 B1
(45) Date of Patent: Jan. 22, 2019

(54) METHOD FOR ROBOTIC DEVICES TO AUTHENTICATE USERS

(71) Applicant: Bobsweep Inc., Toronto (CA)

(72) Inventors: Ali Ebrahimi Afrouzi, San Jose, CA (US); Soroush Mehrnia, Copenhagen (DK); Amin Ebrahimi Afrouzi, Berkeley, CA (US); Masih Ebrahimi Afrouzi, Berkeley, CA (US); Azadeh Afshar Bakooshli, San Jose, CA (US)

(73) Assignee: AI Incorporated, Toronto (CA)

( * ) Notice: Subject to any disclaimer, the term of this patent is extended or adjusted under 35 U.S.C. 154(b) by 472 days.

(21) Appl. No.: 14/820,505

(22) Filed: Aug. 6, 2015

Related U.S. Application Data

(60) Provisional application No. 62/041,113, filed on Aug. 24, 2014.

(51) Int. Cl.
*G06K 9/00* (2006.01)
*G06F 21/32* (2013.01)

(52) U.S. Cl.
CPC ........ *G06F 21/32* (2013.01); *G06K 9/00087* (2013.01); *G06K 2009/00932* (2013.01)

(58) Field of Classification Search
CPC .............. G06F 21/32; G06K 9/00087; G06K 2009/00932
USPC ......................... 711/103, 151, 158; 365/185
See application file for complete search history.

(56) References Cited

U.S. PATENT DOCUMENTS

| | | | | |
|---|---|---|---|---|
| 7,729,518 | B2* | 6/2010 | Awatsu | G06K 9/00 340/5.53 |
| 9,908,239 | B1* | 3/2018 | O'Brien | B25J 9/1666 |
| 2005/0226468 | A1* | 10/2005 | Deshpande | H04M 1/66 382/115 |
| 2006/0036873 | A1* | 2/2006 | Ho | G06F 21/32 713/186 |

(Continued)

*Primary Examiner* — Michael Pyzocha
(74) *Attorney, Agent, or Firm* — STLG ip Law Firm; Soody Tronson

(57) ABSTRACT

The present invention proposes a method for robotic devices to accurately identify authorized users. Biometric data of users is supplied to the system through biometric scanners. Biometric profiles of authorized users are identified to the system during an initial set-up phase. Subsequently, users provide biometric data to the system through the scanners in order to be authenticated. Received data is compared to the original stored profiles, and when a match is found, that user is authenticated. In another aspect of the invention, a time-activated memory storage process is utilized to prevent malicious attempts to overcome the authentication process. Memory cells become writable in successive time slots, after which point the memory cells are converted to read-only. If a user is authenticated during a particular time slot, their biometric data is written in the available memory cell. If no user is authenticated, the available memory cell is written with junk data. In this way, used memory cells may not be altered by a malicious attack. Furthermore, a loyalty metric is established for each user and stored in a loyalty index. The loyalty metric of each user is increased with each successful authentication. Functions of the robotic device may be assigned minimum loyalty requirements such that users must have had a number of successful past authentications in order to access some of the functions of the device.

6 Claims, 4 Drawing Sheets

(56) References Cited

U.S. PATENT DOCUMENTS

| | | | |
|---|---|---|---|
| 2008/0025118 A1* | 1/2008 | Scheuerlein | G11C 11/56 365/201 |
| 2009/0199264 A1* | 8/2009 | Lang | G06F 21/31 726/1 |
| 2010/0234995 A1* | 9/2010 | Zini | G05B 19/41895 700/258 |
| 2011/0063094 A1* | 3/2011 | Meiertoberens | A61B 5/0002 340/12.5 |
| 2013/0182716 A1* | 7/2013 | Gemelli | H04L 49/1523 370/419 |
| 2014/0041008 A1* | 2/2014 | Roskind | G06F 21/316 726/8 |
| 2015/0013000 A1* | 1/2015 | Linnakangas | H04L 63/08 726/14 |
| 2015/0242605 A1* | 8/2015 | Du | G06F 21/32 726/7 |
| 2015/0273704 A1* | 10/2015 | Inaba | B25J 9/161 700/264 |
| 2015/0347734 A1* | 12/2015 | Beigi | G06F 21/32 713/155 |
| 2016/0354165 A1* | 12/2016 | Uenoyama | G06Q 30/04 |
| 2017/0149725 A1* | 5/2017 | Kuriyama | H04L 51/32 |

* cited by examiner

FIG. 4

| Function | Minimum Loyalty Metric |
|---|---|
| Speed 2 | 25 |
| Speed 3 | 35 |
| Speech | 35 |
| Surveillance Camera | 60 |
| Record Audio | 65 |
| Run Algorithm A | 70 |
| Add New User | 90 |

METHOD FOR ROBOTIC DEVICES TO AUTHENTICATE USERS

CROSS-REFERENCE TO RELATED APPLICATIONS

This application claims the benefit of provisional patent application Ser. No. 62/041,113, filed Aug. 24, 2014 by the present inventor.

FIELD OF INVENTION

The present invention relates to robotic devices. More particularly, the invention relates to a method for robotic devices to accurately authenticate one or more users.

BACKGROUND OF INVENTION

The following is a tabulation of some prior art that presently appears relevant:

U.S. Patent Documents

| U.S. Pat. No. | Kind Code | Issue Date | Patentee |
| --- | --- | --- | --- |
| 6,078,265 | A | Jun. 20, 2000 | Nettel Technologies, Inc |
| 5,845,733 | A | Dec. 8, 1998 | Adam Wolfsen |
| 7,729,518 | B2 | Jun. 1, 2010 | Fujitsu Limited |
| 7,024,564 | B2 | Apr. 4, 2006 | Safenet, Inc. |

As robots and electronic computing devices are increasingly used for important and sensitive purposes, authentication methods have become more and more critical. Lock and key systems are a traditional form of protecting information. As technology advanced, digital passwords were introduced. In U.S. Pat. No. 6,078,265 (Nettel Technologies, Inc.), fingerprint readers were introduced which utilized the user's fingerprint instead of a key to access information. In U.S. Pat. No. 5,845,733 (Adam Wolfsen), human retina scanning was proposed.

In prior art, extensive effort has been put toward advancing authentication systems, but all of the described methods worked by opening the system with a more complex method. If an intruder were to somehow overcome the security system, he could then easily change the privileges and grant himself the clearance needed for access to the information. Although these solutions advanced authorization technology, if they are bypassed, the rest of the system becomes vulnerable. A need exists for a method to secure information that cannot be bypassed, overridden, overcome or hacked. A need exists for a method for electronic computing devices to reliably identify users, the method which cannot be maliciously changed by intruders.

SUMMARY OF INVENTION

It is a goal of the present invention to provide a method for robotic entities to recognize approved operators that is resistant to malicious attacks.

It is a goal of the present invention to provide a method for robotic entities to distinguish between commands from approved users and commands from outside entities.

It is a goal of the present invention to make robots more reliable and secure.

It is a goal of the present invention to make robots more suitable for carrying out highly sensitive tasks.

The present invention achieves the aforementioned goals through an operator recognition system in which a biometric scanner is used to identify the rightful owner of the device. A physical scan monitoring the user's fingerprint, palm print, or blood vessels in the hand yield unique and recognizable results for each individual. Data from each scan is stored in a time-sensitive memory unit wherein memory cells may be written only during a specific timeslot, after which point they become read-only. Written memory cells are thus irreversibly changed. The robotic device keeps a loyalty index to track user recognition. Each time the device receives a correct biometric scan from an authorized user, that user's loyalty metric increases. The device's functions will be operable to users that meet predetermined or configured loyalty index thresholds. Scans will be limited to a certain number within a given time frame, so that malicious attempts to establish loyalty over a short period of time are not possible. Because prior data cannot be altered, malicious attacks cannot succeed in creating a falsely authorized user spontaneously.

In some embodiments, various levels of operating clearance may be assigned to users of various levels of measured loyalty.

In some embodiments, data is stored on a dedicated non-volatile random-access memory unit independent from other parts of the robot's computer system.

BRIEF DESCRIPTION OF DRAWINGS

FIG. 4 shows a sample table of loyalty metrics required for different functions of a robot.

DETAILED DESCRIPTION OF THE INVENTION

The present invention proposes a system for a robotic device to authenticate one or more users.

Briefly, the system works by scanning and storing one or more biometric features of users, which are used to identify the users. A fingerprint, palm print or the hand blood vessel parameters may be scanned with a biometric scanner within the device. During an initial set-up period, authorized users are identified to the system using the biometric scanner. A biometric profile of each authorized user is saved in a database. Each authorized user begins with an initial loyalty metric stored in a loyalty index. Anytime a user is authenticated by matching a biometric scan with one of the saved biometric profiles, that user's loyalty metric is increased. The device's various functions are operable to users based on their loyalty metrics. In some embodiments, the loyalty levels required for different functions may be configured by users during set-up so that the authorized user or users can decide which functions are accessible to users based on their loyalty metric.

In some embodiments, a minimum time interval between scans is imposed to prevent the system from being circumvented by malicious attacks. The system accepts only one scan action within a preset time period. Thus, an intruder would not be able to establish a high loyalty metric over a short period of time in order to gain full access to the system.

Figure 1:
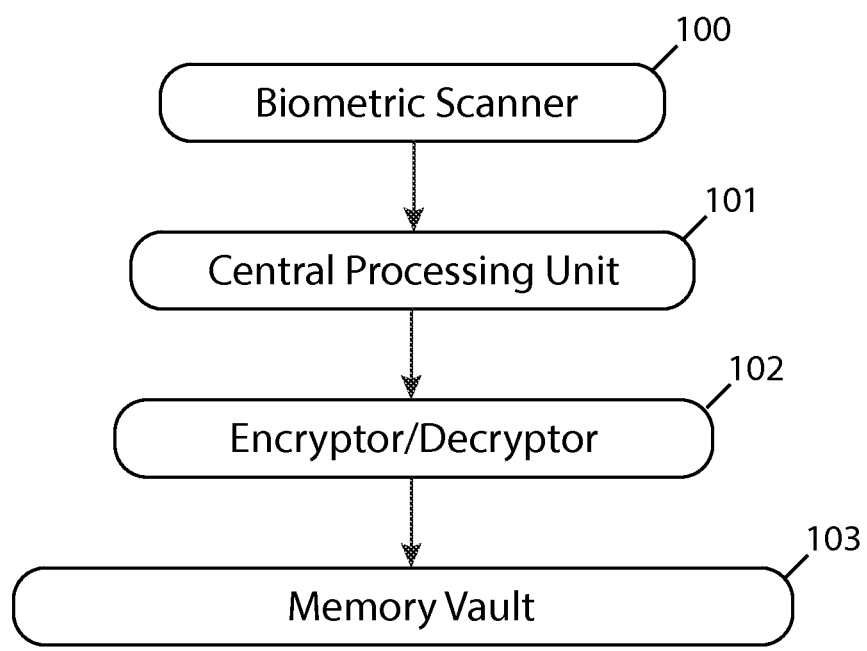
FIG. 1 depicts the hardware subsystems in the proposed invention.

FIG. 1 illustrates the process of receiving and storing biometric data. The biometric scanner 100 registers user input and sends data to a central processing unit 101. In some embodiments, the central processing unit uses an encryptor/decryptor subsystem 102 to encrypt the data for further protection. Data is then stored in a memory vault 103.

A new type of memory storage, referred to as Time Access Memory (TAM) is proposed in the present invention. Unlike currently available memory types, TAM is a form of read-only memory in which memory cells are associated with successive time slots. Each memory cell is usable only within its time slot, after which point the memory cell, if not used, is permanently filled with junk data and becomes unwritable. The next memory cell becomes active in the next time slot, and may be filled only during that time slot. As the process continues, memory cells are either written with data during the time slot, or filled with junk data. Either way, memory cells whose time slots have passed are unchangeable.

Figure 2:
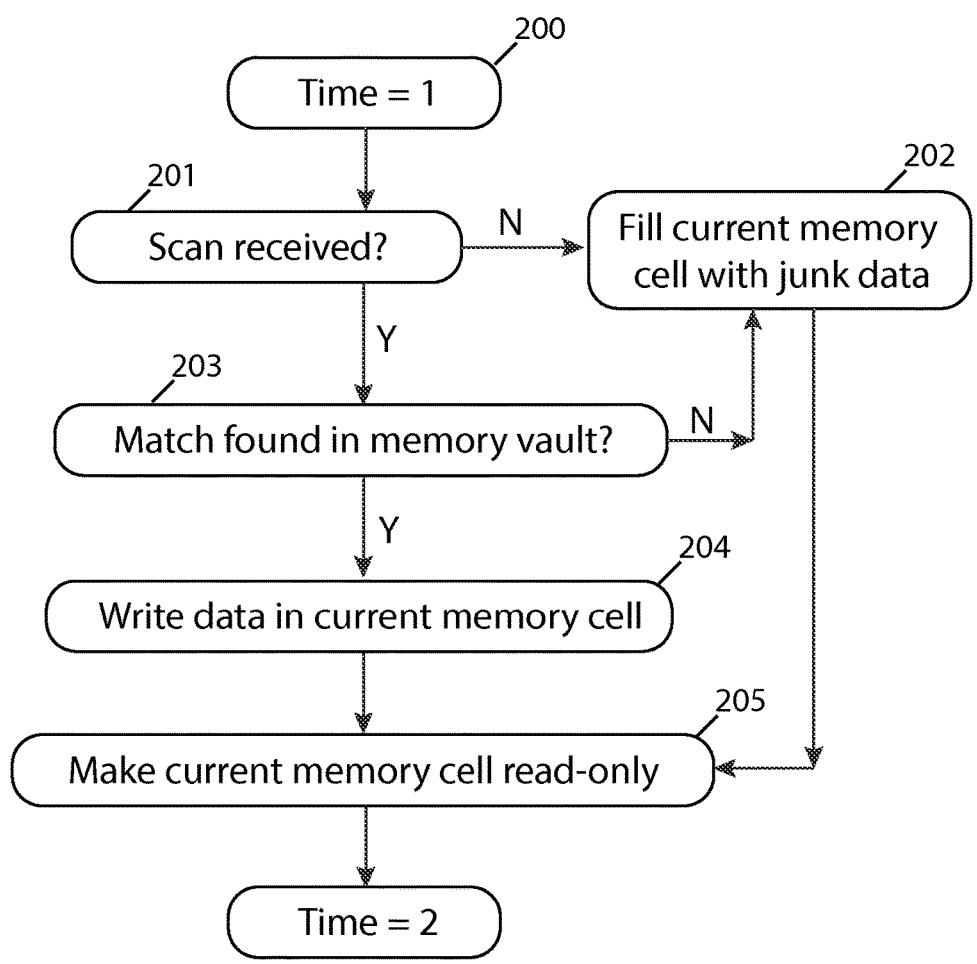
FIG. 2 shows the process for using Time Access Memory (TAM).

Referring to FIG. 2, the process for storing data with Time Access Memory (TAM) is shown. In a first step 200, discrete time is 1. In a next step 201, the system checks for any received biometric scan data. If no biometric scan data is received, the method continues to a next step 202 to fill the current memory cell with junk data. If biometric scan data is received, the method proceeds to a next step 203 to check the received data against stored data for a match. If no match is found, the method proceeds to step 202 to fill the current memory cell with junk data. If a match for the received biometric scan data is found, the method proceeds to a next step 204 to write the biometric scan data in the current memory cell. In a next step 205, the method makes the current memory cell read-only. The process continues in a like manner as discrete time continues. In each discrete time slot, the memory cell filled corresponds to the current discrete time. Once cells are made read-only, they cannot be rewritten, thus making this memory storage system resistant to manipulation.

Figure 3:
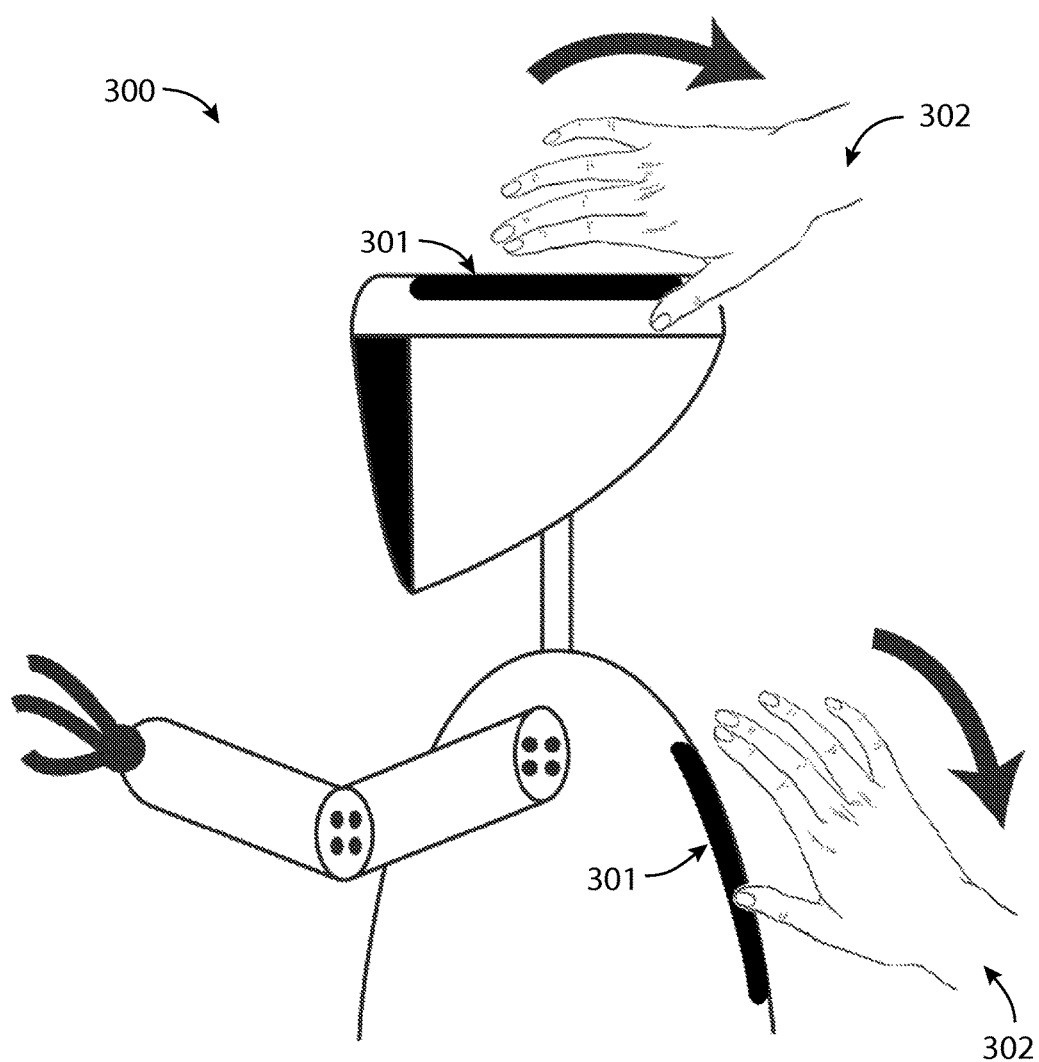
FIG. 3 shows a humanoid robot equipped with the described authentication means.

Referring to FIG. 3, a sample humanoid robot 300 is illustrated. Two biometric scanners 301 are provided on the robot. The number and positioning of biometric scanners may vary and is not limited. Upon touching either of the biometric scanner surfaces with his or her hand 302, a user provides biometric identification features to sensors within the biometric scanners.

As explained previously, each time a biometric scan is received and matching biometric data is identified within the saved database, the corresponding user's loyalty metric is increased by a predetermined amount. A loyalty index stores the loyalty metric of every authorized user. Thus, users' loyalty metrics increase with each authentication, such that, over time, users may achieve a very high loyalty metric. The various functions of the robotic device may be assigned loyalty metric requirements in order to be commanded by users. Users with less than the predetermined amount of loyalty will be unable to execute certain commands. In this way, the most sensitive functions of the robotic device may be controlled only by users with an adequate amount of loyalty. In some embodiments, the loyalty requirements associated with each function may be configured by users during an initial set-up phase.

Referring to FIG. 4, a sample table 400 of loyalty metric requirements for various functions of a robotic device is illustrated. Requirements for functions may be predetermined or configured during an initial set-up phase. Users without less than the required amount of loyalty for any given function will not be permitted to command that function. Any level of loyalty may be assigned to any function without limitation; the table shown is for illustration purposes only.

The system is not limited to humanoid robots, but rather can be implemented in any type of robot. Additionally, the number of users is not limited and be configured during the initial setup. Specialized personnel and/or factory equipment will be required to reset or initialize the related user information data.

We claim:

1. A method for establishing and maintaining a user loyalty metric to accesses a plurality of robotic device functions comprising:
   receiving a biometric scan of a user by a robotic device;
   authenticating the user;
   providing a time access memory, wherein the time access memory comprises a plurality of memory cells;
   assigning a predetermined time slot to each of the plurality of memory cells, wherein each of the plurality of memory cells is available for writing only during the predetermined time slot, after which each memory cell is made read-only;
   storing the biometric scan of the user if the user is authenticated with the time access memory;
   increasing the user loyalty metric if the user is authenticated, wherein the user loyalty metric increases each time the user is authenticated;
   providing access to the plurality of robotic device functions in accordance with the user loyalty metric.

2. The method of claim 1, further comprising:
   registering the user to the robotic device, the registering comprising,
   authorizing the user to the robotic device; and
   establishing an initial user loyalty metric for the user.

3. The method of claim 1, wherein each of the plurality of robotic device functions are assigned a minimum loyalty metric requirement for access.

4. The method of claim 1 in which, if the user is not authenticated, junk data is written to a currently available memory cell.

5. The method of claim 1 wherein the biometric scan is selected from the group consisting of: a fingerprint scan, a palm print scan, and a hand blood vessel scan.

6. The method of claim 1 wherein the robotic device is limited to receiving no more than a predetermined number of biometric scans in a predetermined period of time.

* * * * *